(12) United States Patent
Tchakam-Tchasso et al.

(10) Patent No.: US 10,465,820 B2
(45) Date of Patent: Nov. 5, 2019

(54) SELF-AERATING VALVE

(71) Applicant: NESTEC S.A., Vevey (CH)

(72) Inventors: Theodore Tchakam-Tchasso, Saint Louis (FR); Albert Kurnia, Constance (DE)

(73) Assignee: Societe des Produits Nestle S.A., Vevey (CH)

( * ) Notice: Subject to any disclaimer, the term of this patent is extended or adjusted under 35 U.S.C. 154(b) by 6 days.

(21) Appl. No.: 15/573,543

(22) PCT Filed: Jun. 20, 2016

(86) PCT No.: PCT/EP2016/064165
§ 371 (c)(1),
(2) Date: Nov. 13, 2017

(87) PCT Pub. No.: WO2016/207107
PCT Pub. Date: Dec. 29, 2016

(65) Prior Publication Data
US 2018/0087689 A1    Mar. 29, 2018

(30) Foreign Application Priority Data

Jun. 22, 2015 (EP) .................................... 15173077

(51) Int. Cl.
*F16K 39/02* (2006.01)
*F16K 1/30* (2006.01)
*F16K 1/20* (2006.01)

(52) U.S. Cl.
CPC .............. *F16K 39/028* (2013.01); *F16K 1/20* (2013.01); *F16K 1/205* (2013.01); *F16K 1/307* (2013.01)

(58) Field of Classification Search
CPC ........ F16K 39/00; F16K 39/02; F16K 39/028; F16K 1/20; F16K 1/2007; F16K 1/2042;
(Continued)

(56) References Cited

U.S. PATENT DOCUMENTS 3,402,738 A    9/1968   Perolo
4,033,549 A    7/1977   Stamer
(Continued)

*Primary Examiner* — Ian G Paquette
(74) *Attorney, Agent, or Firm* — K&L Gates LLP

(57) ABSTRACT

The present invention is directed to a self-aerating valve (1) comprising a valve body (2) with an aperture (3), and a valve flap (4) swivel-mounted to the valve body (2). The valve flap (4) is particularly configured to swivel between a closing position for closing the aperture (3), and an opening position for opening the aperture (3). Further, the self-aerating valve (1) comprises an air-supply port (5) connectable to an air-supply (12). The valve flap (4) is designed to release air supplied to the air-supply port (5) into the aperture (3) of the valve body (2) in the closing position. Preferably, the valve flap (4) is designed to release the air through its whole surface area (6), wherein the surface area (6) comprise a porous membrane (7) fluidly connected to the air-supply port (5). The self-aerating valve 1 may be used in an aerating system (11) of the present invention, which includes also an air-supply (12) fluidly connected to the air-supply port (5). The aerating system (11) may further comprise a drying unit (13) of the air-supply (12) adapted to dry and preferably also cool air supplied through the air-supply (12) to the air-supply port (5).

17 Claims, 5 Drawing Sheets

(58) Field of Classification Search
CPC . F16K 1/205; F16K 1/22; F16K 1/221; F16K 1/222; F16K 1/226; F16K 1/30; F16K 1/304; F16K 1/307; F16K 1/308
See application file for complete search history.

(56) References Cited

U.S. PATENT DOCUMENTS

| | | | |
|---|---|---|---|
| 4,308,894 A | | 1/1982 | Carpentier |
| 4,739,794 A | * | 4/1988 | Ballun .................... F16K 1/22 137/601.14 |
| 9,573,740 B2 | * | 2/2017 | Cannon, Jr. ........ B65D 81/2015 |
| 2008/0142751 A1 | * | 6/2008 | Wegman .................. F16K 1/22 251/306 |
| 2013/0187069 A1 | * | 7/2013 | Ranpuria ............... F16K 1/222 251/212 |
| 2017/0299077 A1 | * | 10/2017 | Jabcon .................. F16K 21/06 |
| 2018/0266585 A1 | * | 9/2018 | Ambs .................. F16K 39/028 |

* cited by examiner

SELF-AERATING VALVE

CROSS REFERENCE TO RELATED APPLICATIONS

The present application is a National Stage of International Application No. PCT/EP2016/064165, filed on Jun. 20, 2016, which claims priority to European Patent Application No. 15173077.7, filed on Jun. 22, 2015, the entire contents of which are being incorporated herein by reference.

The present invention presents a self-aerating valve, an aerating system including the self-aerating valve, and a discharging method making use of the self-aerating valve. In particular, the self-aerating valve of the present invention is preferably a discharge valve for discharging products from a negatively pressurized (e.g. vacuum) chamber, and is designed to release air into said chamber before its opening.

It is known from the state of the art to utilize a butterfly valve for opening and closing a negatively pressurized chamber, for instance, for discharging products from this chamber. The negatively pressurized chamber is, for example, a vacuum chamber of an extruder setup. The butterfly valve typically sits at the exit of the vacuum chamber. When products are to be discharged from the chamber, at first air is inserted into the chamber via a vacuum breaking valve, and then the butterfly valve is opened to allow the products to exit the chamber. The products may thereby exit the chamber, for instance, due to the gravitational force. Then, the chamber is again depressurized, to again allow product to be loaded into the chamber. In this case, the butterfly valve is usually positioned at a bottom portion of the chamber. During its practical use, the state of the art butterfly valve is typically operated in a stop-and-go continuous process, in order to continuously discharge products from the chamber.

However, employing a butterfly valve in such a setup has several drawbacks, in particular, when the products to be discharged from the negatively pressurized chamber are hygroscopic products, particularly hot (up to 90° C.), porous and hydroscopic products, for instance, products as produced by a typical extrusion process. Moreover, a discharging surface area in the butterfly valve is significantly less favorable for the product flow due to the flap presence in the opening/discharging position.

That is, the hygroscopic products in the chamber tend to accumulate on the butterfly valve that gets compacted on the sealings of the rotatable valve flap of the butterfly valve. Thus, the butterfly cannot close properly after a time duration, allowing moist ambient air entering the chamber can easily lead to a clumping of these hot, hygroscopic, typically very porous products. The clumping negatively affects the final product quality.

Further, butterfly valves as currently employed in the state of the art have also the disadvantage that due to their lateral sealing and their way of functioning, they are relatively prone to wear. Thus, the danger of leaks occurring over time is comparatively high. Such leaks, however, may also allow moist ambient air to enter the process chamber.

It is another disadvantage of said butterfly valves in this respect that products, which accumulation within the chamber on the butterfly valve flap and its sealing, tend to cause a deterioration of the valve's tightness. This, however, increases again the risk of moist ambient air entering the chamber.

In summary, the state of the art butterfly valve is in general rather prone to leakage occurrence when operated over longer time scales.

In view of the above-mentioned disadvantages of the currently employed butterfly valves, the present invention intends to improve the state of the art. In particular, the present invention has the object to provide a new kind of valve, which allows a more reliable discharging of products, particularly of hygroscopic products, more particularly of hot, porous and hydroscopic products, from specifically a negatively pressurized chamber. The new valve should be able to reduce the risk of leakage of moist ambient air into the chamber. Furthermore, the new valve should allow breaking the negative pressure in the chamber, while utilizing an aeration area that is as large as possible. Moreover, the new valve should address the risk of fine product accumulation on the valve, and the related risk of a deterioration of the valve tightness over time. Finally, the new valve should generally help to reduce or even suppress clumping of products within the chamber.

The above-mentioned object of the present invention is solved by a self-aerating valve, an aerating system, and a method of discharging, which are respectively described in the independent claims. The subject-matter of the dependent claims develops further advantages of the present invention.

In particular, the present invention is directed to a self-aerating valve, comprising a valve body with an aperture, a valve flap swivel-mounted to the valve body and configured to swivel between a closing position for closing the aperture and an opening position for opening the aperture, and an air-supply port connectable to an air-supply, wherein the valve flap is designed to release air supplied to the air-supply port into the aperture of the valve body in the closing position and wherein the valve flap, preferably the surface area of the valve flap, comprises a porous membrane connected to the air-supply port for releasing the supplied air.

By being able to release air into the aperture of the valve body in its closing position, the self-aerating valve can be used to break a negative pressure in a chamber, to which it is attached. In the present invention, the term "air" is to be understood as any kind of gas that is suitable to be used in such a negatively pressurized chamber, for instance, breathing air, nitrogen, carbon dioxide, inert gases, or mixtures thereof, preferably breathing air or nitrogen. In particular, it is possible with the self-aerating valve to release dry and preferably also cold air into the aperture, which can, for example, remove heat and vapor from products in the chamber, for example highly hygroscopic products, without the risk of introducing moist ambient air from the outside of the chamber. This significantly reduces the risk of a clumping of the products within the chamber, in particular of products collecting on and at the self-aerating valve. Accordingly, the product quality is improved and a more reliable discharge of the products from the chamber is achieved.

"Cool" or "cold" air means air (or any other gas used for the present invention) that is colder than ambient air, preferably colder than 20° C. "Dry" air means air (or any other gas used for the present invention) that is dryer than ambient air, preferably dryer than 60% RH.

Due to the design of the self-aerating valve with its valve body and the swiveling valve flap, a risk of a deterioration of the valve tightness, particularly caused by products collecting in the chamber on the valve, is further reduced. In this respect, the air that is released into the aperture by the self-aerating valve creates one or more small whirls close to the valve flap, which counter the risk of fine product accumulation on the valve flap.

For instance, the valve flap is mounted to the valve body via a swivel arm, which is configured to swivel the valve flap away from the aperture and towards the aperture, respectively.

Advantageously, the valve flap is designed to release the air through its whole surface area. The whole surface area of the valve flap preferably corresponds to substantially the whole area of the aperture.

Thereby, the aerating area usable for elevating the pressure in the negatively pressurized chamber is maximized. Furthermore, the products in the chamber, especially those collecting at the valve flap, are whirled up and are fluidized, which reduces the risk of clumping of the products, and keeps the products loose and dry. Loose products can be discharged more reliably from the chamber, after the valve flap swivels into its opening position. Thereby, the products can be discharged from the chamber, for instance, by gravitational force.

Advantageously, the valve flap, preferably the surface area of the valve flap, comprises a porous membrane connected to the air-supply port.

In the present invention, the term "connected" means at least a connection for a fluid flow (i.e. "fluidly connected") between the respective features; here between the porous membrane and the air-supply port. The porous membrane allows inserting the air into the aperture of the valve body without risk of product inclusion into the membrane. The membrane allows further a very homogenous introduction of the air into the chamber, which fluidize the products collected in the chamber and loosen the product in contact with the valve flap, particularly evenly over the whole surface area of the valve flap.

Preferably, the porous membrane has a thickness of about 2-20 mm, more preferably about 5-12 mm, most preferably about 8 mm.

Advantageously, the porous membrane is a plastic and/or ceramic filter comprising a plurality of pores each in the range of 1-100 µm, preferably 10-40 µm for releasing the air.

Such a porous membrane is mechanically stable, but still cheap in fabrication. Furthermore, the plurality of pores, for instance with a pore size of 40 µm, allows a distributed release of the air into the chamber, while at the same time acting as a filter for the products to be discharged. "Pore size" means the average pore diameter in approximation of pores as spheres. Preferably, the material of the membrane is porous polyethylene. This material can also be used well in the area of food production.

Advantageously, the valve body is designed to receive the valve flap at least partly in the closing position, wherein preferably the valve flap has a (truncated) conical shape that is insertable partly into the aperture of the valve body, more preferably in plane contact with a corresponding inclined circumferential surface of the valve body delimiting the aperture.

This design improves the air tightness of the self-aerating valve.

Advantageously, a seal is provided between the valve flap and the valve body in the closing position. The valve body can be provided with the seal around the aperture, onto which the valve flap is pressed in the closing position.

The seal is, for instance, impermeable for the air, i.e. is an air seal. The seal can also be impermeable for fluids or liquids. By means of the seal, the tightness of the valve is improved, and the risk of leaks that allow moist ambient air to enter the chamber is reduced.

Advantageously, the valve body comprises at least one nozzle connectable to an air-supply. The air-supply can be the same as or different from the air-supply for supplying air to the air-supply port.

Advantageously, the at least one nozzle is connected, i.e. at least fluidly connected, to the air-supply port.

The at least one nozzle is preferably provided at or at least in close proximity to the aperture of the valve body and the valve flap. In a preferred embodiment, the at least one nozzle is provided at the valve body and is preferably directed (in)to the aperture. Preferably, the at least one nozzle may be inclined relative to a radial direction of the aperture and directed in or tilted with respect to a plane spanned by the aperture. Advantageously, a plurality of nozzles can be provided around the aperture preferably in an evenly distributed manner. When air is released by the at least one nozzle, turbulences are created in the region of the valve flap or better the aperture, so that any residues of the products, caused by the product discharge, in the chamber are removed, in particular from the valve flap and the sealing of the valve. Thereby, sealing of the valve can be secured. Moreover, the risk of moist ambient air entering the chamber can be further reduced or can even be completely suppressed. The at least one nozzle can also be used to release air, when the valve flap is swiveling from its closing to its opening position, or when the valve flap is held in the opening position, so that the products to be discharged from the chamber are impinged with air, and are further loosened and fluidized.

Due to this design of the self-aerating valve, the complete aperture in the valve body can be utilized for discharging products, which is a further advantage in view of the commonly used butterfly valves.

Advantageously, the valve body comprises a conically extending portion providing a connection for a container.

Thus, the self-aerating valve can act as an adapter between, for instance, a negatively pressurized chamber and a discharge container, into which products from the chamber are to be discharged. In this way, the risk for the products getting in touch with moist ambient air is further reduced. The discharge container may have ambient pressure, or may be (negatively) pressurized but with a higher absolute pressure than the chamber.

Advantageously, the self-aerating valve is designed for discharging hygroscopic products, particularly hot (up to 90° C.), porous and hydroscopic products, from a negatively pressurized chamber, preferably from a vacuum chamber.

The present invention is also directed to an aerating system for a negatively pressurized chamber, including a self-aerating valve according to the above description, and an air-supply connected, i.e. at least fluidly connected, to the air-supply port of the self-aerating valve.

With the aerating system of the present invention, dried and preferably also cooled air can be introduced into the negatively pressurized chamber via the self-aerating valve. Thereby, all advantages described above for the self-aerating valve are achieved.

Advantageously, the air-supply comprises a drying unit adapted to at least dry and preferably also cool air supplied through the air supply to the air-supply port.

Accordingly, the advantages of dry (and cool) air introduced into the chamber can be achieved with the aerating system.

Advantageously, the aerating system is configured to supply air, preferably air that is dryer and more preferably also colder than ambient air, to the air-supply port, at least before the valve flap of the self-aerating valve swivels from the closing position to the opening position.

By supplying the air the negative pressure in the chamber is increased, e.g., to ambient pressure, or preferably even to above ambient pressure (1.2 to 1.9 bar). At the same time, the products having collected within the chamber at the self-aerating valve are whirled up and are fluidized, so that they can thereafter be discharged more easily from the chamber, for instance by gravitation, in a more reliable manner and with less risk of product clumping caused by interaction with moist ambient air.

Advantageously, the valve body of the self-aerating valve comprises at least one nozzle connected, i.e. at least fluidly connected, to an or the air-supply, and the aerating system is configured to supply air, preferably air that is drier and more preferably also colder than ambient air, to the at least one nozzle, at least while the flap swivels from the opening position to the closing position.

Thereby, turbulences are created in the region of the valve flap or better the aperture, so that any residues of the products, caused by the product discharge, in the chamber are removed, in particular from the valve flap and the sealing of the valve. Thereby, sealing of the valve can be secured. Moreover, the currently discharging products are additionally impinged with air, and are thus further loosened. The further loosening reduces the risk of clumping of the products even more. Accordingly, another improvement in product quality can be achieved.

Advantageously, the aerating system further comprises a vacuum chamber for collecting hygroscopic products, particularly hot (e.g. up to 90° C.), porous and hydroscopic products, and a discharging area, preferably a discharging chamber or container, for receiving the hygroscopic products, wherein the self-aerating valve is (functionally) provided between the vacuum chamber and the discharging area, and the vacuum chamber and the discharging area are selectively connectable, i.e. at least fluidly connectable, by the self-aerating valve.

The present invention is further directed to a method for discharging hygroscopic products, particularly hot (up to 90° C.), porous and hydroscopic products, from a negatively pressurized chamber, comprising providing air, preferably air that is drier and preferably also colder than ambient air, to the air-supply port of a self-aerating valve according to the present invention, preferably of an aerating system according to the present invention, at least before swiveling the valve flap from the closing position to the opening position.

The term "hydroscopic" means a product which has an aw (water activity) between 0.1 to 0.4 and a Tg (transition temperature) below 40° C. at the corresponding aw, preferably between −10° C. to 40° C.

The term "porous" means porosity and is a measure of the void (i.e., "empty") spaces in a material, and is a fraction of the volume of voids over the total volume. The fraction is between 0.05 to 0.9.

The term "negatively pressurized" means a vacuum and is between 1 mbar to 500 mbar, preferably between 1 mbar to 200 mbar, more preferably between 1 mbar to 100 mbar.

Thereby, the above-described advantages of the self-aerating valve are achieved and are put into practice.

In the following, the present invention will be described in more detail with respect to the attached drawings, wherein FIG. 1 shows a self-aerating valve according to an embodiment of the present invention.

Figure 1:
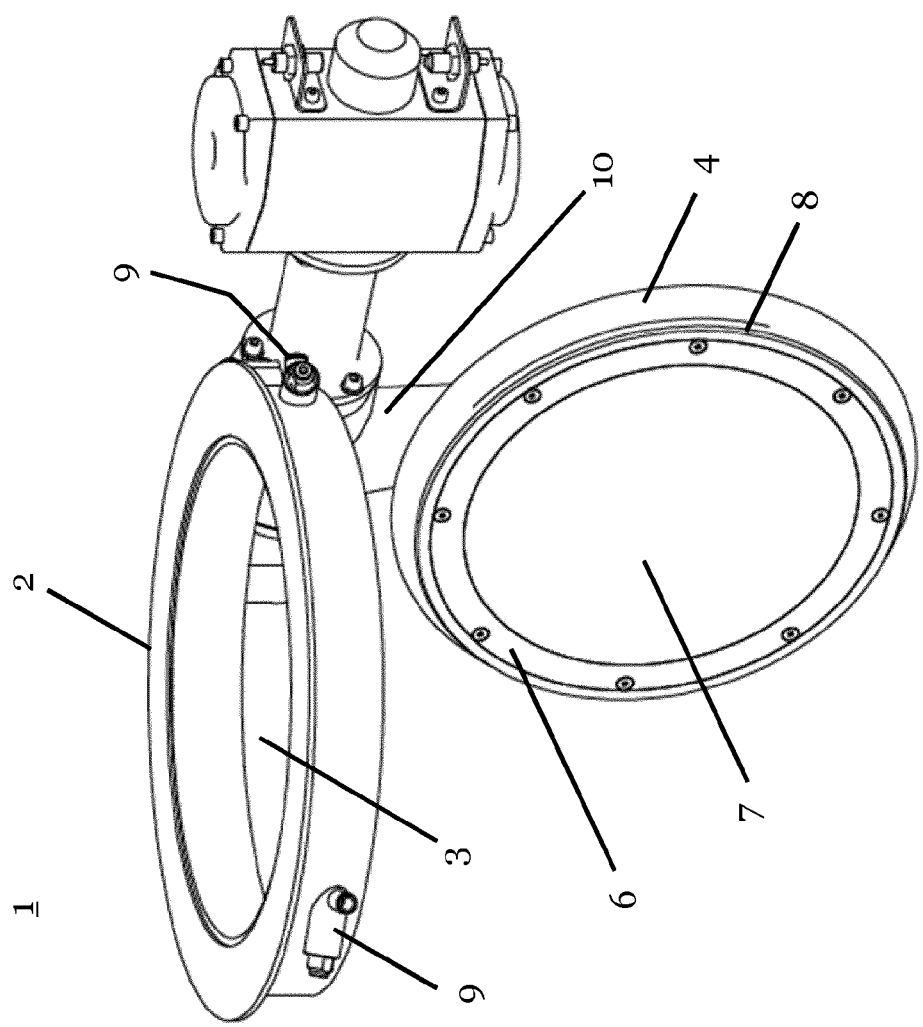

FIG. 1 shows a self-aerating valve 1 according to an embodiment of the present invention. The self-aerating valve 1 comprises a valve body 2 with an aperture 3. Preferably, the valve body 2 is circularly shaped and encloses, in the shape of a ring, the aperture 3 provided in its center. However, the valve body 2 and aperture 3 can also have other shapes, for instance, elliptical, rectangular or square shape. Preferably, the material of the valve body 2 is plastic, ceramic or metal. The self-aerating valve 1 further comprises a valve flap 4, which is swivel-mounted to the valve body 2. Preferably, the valve flap 4 is swivel-mounted to the valve body 2 via a swivel arm 10. The swivel arm 10 is preferably configured to swivel the valve flap 4 away from the aperture 3 and towards the aperture 3, respectively. The swivel arm 10 may be operated mechanically or electrically, for instance, by a motor or drive. In general, the valve flap 4 is able to swivel at least between a closing position, in which it closes the aperture 3 of the valve body 2, and an opening position, in which it opens the aperture 3 of the valve body 2. The valve flap 4 and the swivel arm 10 are preferably made of the same material as the valve body 2.

The self-aerating valve 1 of FIG. 1 further comprises an air-supply port 5, to which air can be supplied, for instance, by an air-supply unit or an air-supply circuit, i.e. which is connectable to an air-supply. The valve flap 4 is configured to release any kind of air that is supplied to the air-supply port 5 into the aperture 3 of the valve body 2, particularly when the valve flap 4 is in its closing position. For instance, as indicated in FIG. 1 (but even better visible in FIG. 2), the air-supply port 5 can be provided directly on a surface of the valve flap 4, which surface faces away from the valve body 2 in the closing position. Alternatively, the air-supply port 5 could also be provided at a rotating axis of the swivel arm 10 or the swivel arm itself. The valve flap 4 would then preferably be fluidly connected to the air-supply port 5, for instance, through a fluid connection within the swivel arm 10.

Preferably, the valve flap 4 is designed to release the air into the aperture 3 over its complete surface area 6, preferably evenly distributed. To this end, the valve flap 4 and preferably its surface area 6 may comprise—as is shown in FIG. 1—a porous membrane 7, which is fluidly connected to the air-supply port 5. The porous membrane 7 is preferably made of plastic and/or ceramic. On the one hand side such a porous membrane 7 may act as a filter for any products in a chamber, to which the self-aerating valve 1 is mounted, and on the other hand side may achieve a homogenous air release over the whole surface area of the valve flap 4. To this end, the size (diameter) of the pores of the porous membrane 7 is preferably in the range of 1-100 μm, more preferably in the range of 10-40 μm. Such membranes provide a good filter function, even for products that are much smaller than the medium pore size. Preferably, the porous membrane 7 is made from porous polyethylene.

Figure 2:
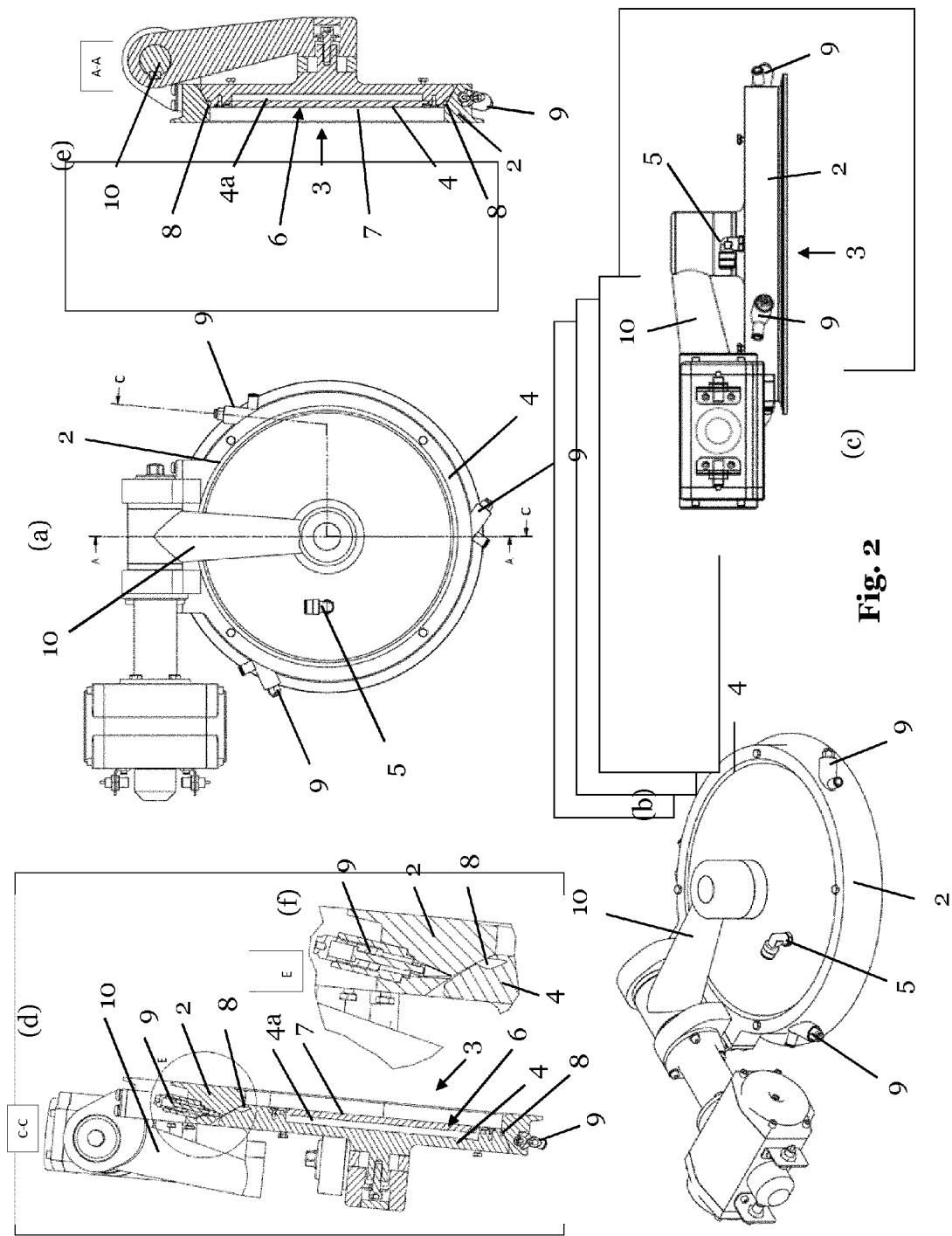
FIG. 2 shows different views of a self-aerating valve according to an embodiment of the present invention.

The valve flap 4 in FIG. 1 is shown in the opening position. When the valve flap 4 swivels into the closing position, it is preferably at least partly received by the valve body 2 (as is shown in FIG. 2). To this end, the valve flap 4 is preferably shaped conically or better having a truncated conical shape, and can at least partly slide into the aperture 3, wherein the valve body 2 preferably has a corresponding inclined circumferential surface delimiting the aperture 3 and adapted to get in plane contact with the truncated conically shaped valve flap 4. For the same effect, the valve flap 4 can also be otherwise slanted or shaped with a step that engages with a corresponding circumferential surface (e.g. having a corresponding step) of the valve body 2. When the valve flap 4 is swiveled into the closing position, a sealing 8 is preferably arranged between the valve body 2 and the valve flap 4. Preferably, the valve body 2 can be provided with the sealing 8, which advantageously follows the shape of the valve body 2, and thus is preferably arranged around the aperture 3. The valve flap 4 is preferably pressed tightly onto the sealing 8, in order to provide the self-aerating valve 1 with low leakage risk.

FIG. 2 shows the self-aerating valve 1 in the closing position, for instance, in a top view in (a). The valve flap 4 is now partly inserted into the valve body 2, and the aperture 3 is completely closed. In this position the self-aerating valve 1 is able to maintain the pressure in a chamber, for instance, a vacuum chamber. FIG. 2 shows in (a) also a plurality of nozzles 9, which are provided at the valve body 2. In particular, three nozzles 9 are shown in FIG. 2. However, the valve body 2 may be equipped with only one such nozzle 9 or with any number of nozzles 9 that can be practically fit into the valve body 2. The plurality of nozzles 9 is preferably distributed equidistantly around the valve body 2, i.e. also around the aperture 3. The one or more nozzles 9 are connectable, for example from the outside of the valve body 2, to an air-supply. The nozzles 9 may also be connected to the same air-supply as the surface area 6 of the valve flap 4. To this end, the nozzles 9 may be fluidly connected to the air-supply port 5.

FIG. 2 shows in (d) a cut through the self-aerating valve 1, namely along the lines C-C indicated in (a). FIG. 2 shows further in (e) a cut through the self-aerating valve 1 along the line A-A indicated in (a). It can be seen in these cut views (d) and (e) of the self-aerating valve 1 that the valve body 2 (e.g. indicated hatched from upper left to lower right in (e)) partly receives the valve flap 4 (e.g. indicated hatched from upper right to lower left in (e)), in order to provide a high tightness of the valve 1 in the closing position. It can also be seen that the valve flap 4 includes preferably a cavity 4a, which acts as dry or compressed air cavity, when air is introduced via the air-supply port 5. The air is then released from the air cavity 4a through the porous membrane 7 into the aperture 3.

The area in (d) of FIG. 2 surrounded by the circle line indicated with 'E' is shown enlarged in FIG. 2 (f). In the enlarged view, it can be seen that the valve flap 4 is shaped conically and slides into the aperture 3, thereby engaging with the valve body 2 which is shaped correspondingly. Due to this engagement, the valve 1 shows improved air tightness. The seal 8 arranged between the valve flap 4 and the valve body 2 in the closing position enhances the air tightness further. The seal 8 can be an O-ring or the like being provided within a circumferential groove in the valve flap 4. The enlargement shows also a nozzle 9, which is directed to blow air onto the portion of engagement between valve flap 4 and valve body 2, and—in the opening position—onto the seal 8, in order to remove product residues.

FIG. 2 shows further in (b) a perspective view of the self-aerating valve 1, and in (c) a side-view of the self-aerating valve. In all views (a)-(e) of the self-aerating valve 1, the swivel arm 10, the at least one nozzle 9, and the valve body 2, into which the valve flap 4 is at least partly inserted in the closing position, are shown.

Figure 3:
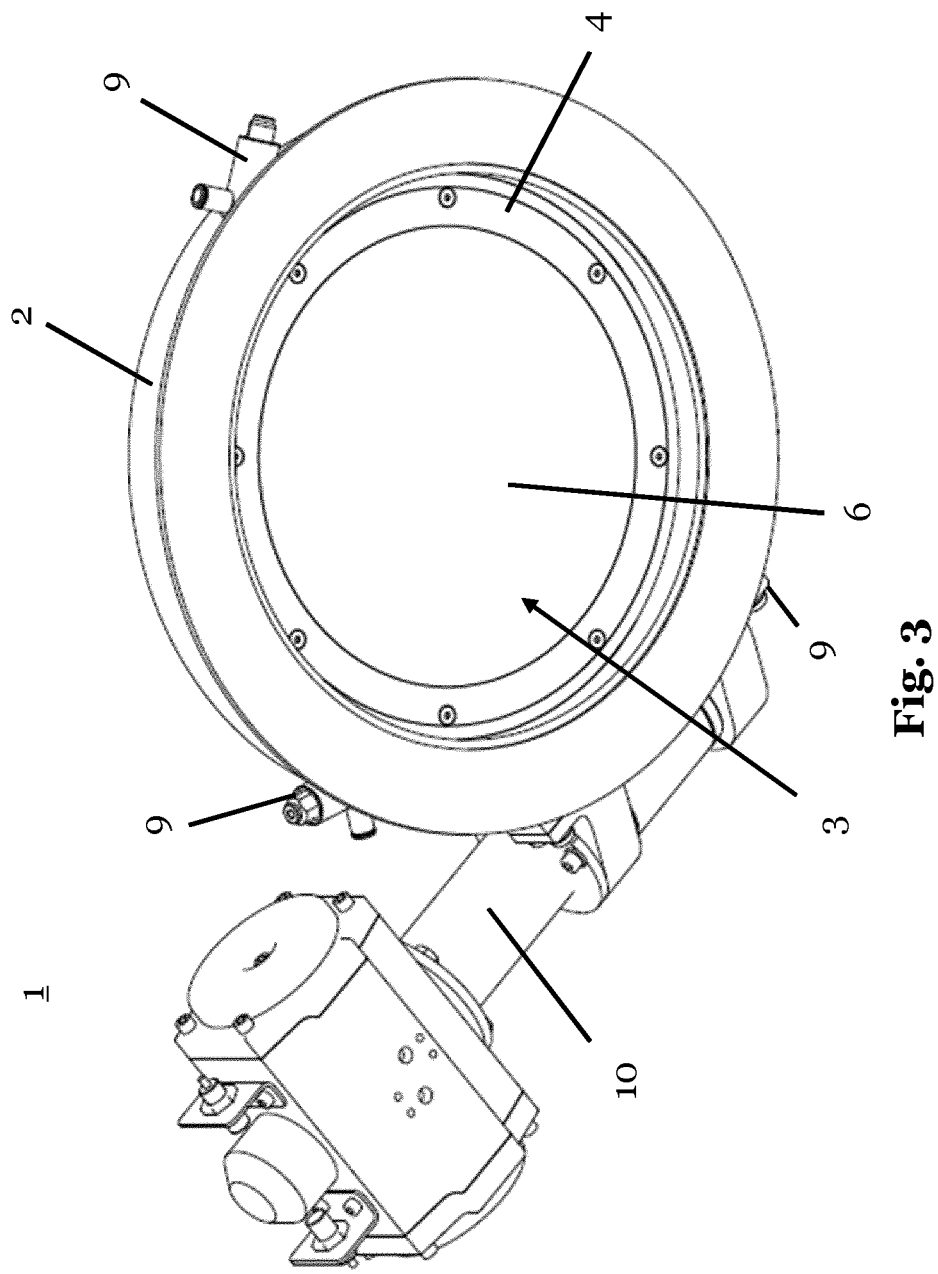
FIG. 3 shows a self-aerating valve according to an embodiment of the present invention.

FIG. 3 shows another view of the self-aerating valve 1 in the closing position of the valve flap 4. The view is from the opposite side as the view in FIG. 2 (a). In particular, the surface area 6 can be seen, over which air can be released into the aperture 3 at least when the valve flap 4 and the valve body 2 are engaged in the closing position.

Figure 4:
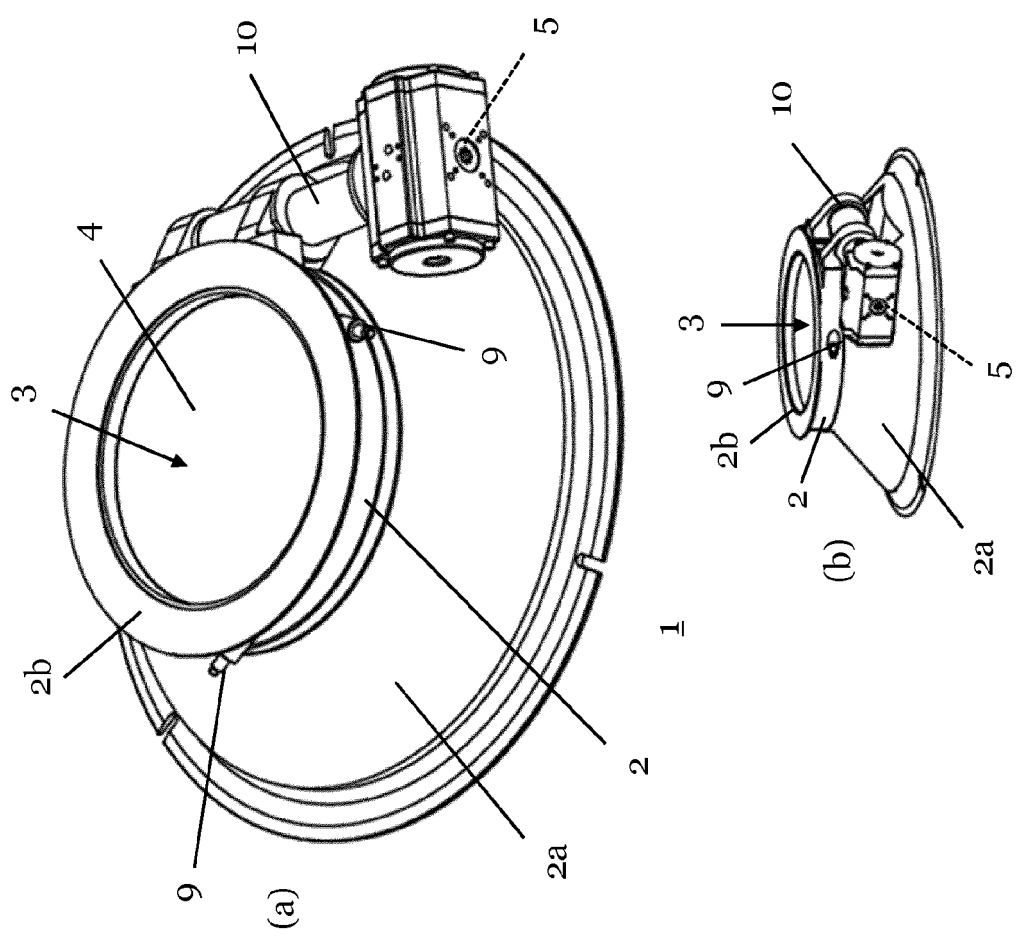
FIG. 4 shows different views of a self-aerating valve according to an embodiment of the present invention.

FIG. 4 shows a variation of the self-aerating valve 1 of the FIGS. 1 and 2, wherein the valve body 2 is further provided with a conically extending portion 2a. Via this conically extending portion 2a a discharge container can be directly connected to the self-aerating valve 1. Thus, the self-aerating valve 1 accordingly functions as an adapter between said discharge container and, for example, a negatively pressurized chamber, to which the valve 1 is mounted and from which products are to be discharged. The (negatively pressurized) chamber can be connected to the valve 1 via a flange portion 2b thereof. In FIG. 4 an optional position for the air-supply port 5 is shown at the swivel arm. This is advantageous for a self-aerating valve 1 with conically extending portion 2a, because the air-supply port can be easily connected to an air-supply, even if a discharge container is connected to the self-aerating valve 1.

Figure 5:
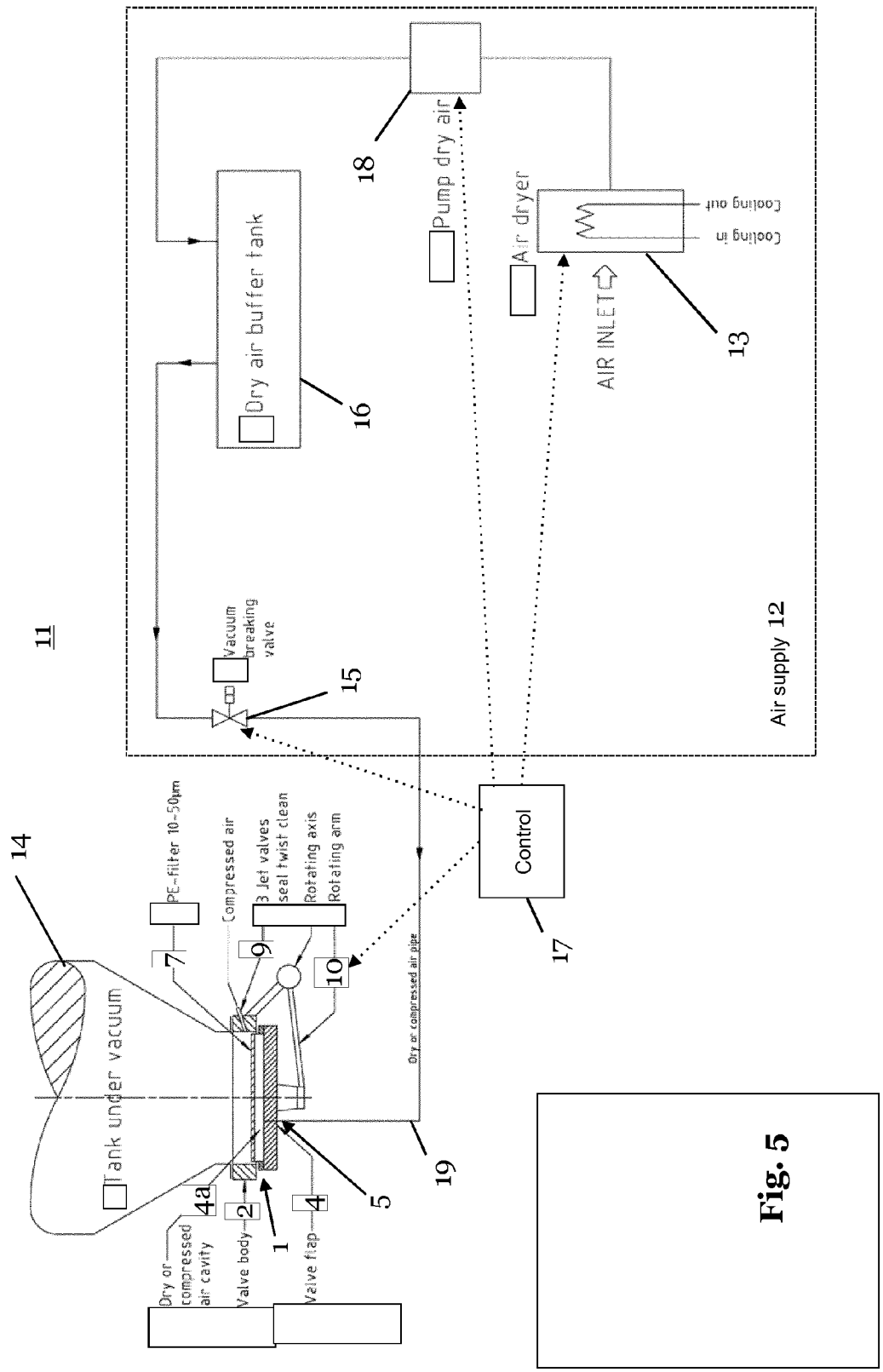
FIG. 5 shows an aerating system according to an embodiment of the present invention.

FIG. 5 shows an aerating system 11 according to an embodiment of the present invention. The aerating system 11 includes a self-aerating valve 1, which may be attached to a negatively pressurized chamber 14 like a tank under vacuum. The self-aerating valve 1 is preferably constructed as described above with respect to the FIGS. 1-4. In FIG. 5 the valve body 2, the valve flap 4 with its optional cavity 4a, the porous membrane 7, a plurality of nozzles 9, and the swivel arm 10 of the self-aerating valve 1 are shown.

The aerating system 11 further comprises at least one air-supply 12 having at least one drying unit 13 for drying air to be supplied via the air-supply 12 to the air-supply port 5 of the valve 1. The drying unit 13 may also be used for cooling the air to be supplied. This is particularly useful when the material to be released via the valve 1 is not only hygroscopic but also porous, and particularly hot and porous. In this regard, the drying unit 13 may be separated into two units (i.e. one unit for cooling and one unit for drying), and is then adapted to cool and dry air, which is supplied through the air-supply 12 to eventually the air-supply port 5 of the valve 1. The air-supply 12 and the valve 1 can, for instance, be fluidly connected via conduits or any other type of pipe connection 19. The drying unit 13 may be a conventional air dryer having an air inlet for air provided, e.g., from the surroundings, and having a cooling inlet and a cooling outlet which thus also results in automatically cooling the air.

The aerating system 11 or better the air-supply 12 may further comprise a pump 18, in order to pump the air from the drying unit 13 to the self-aerating valve 1, i.e. through the air-supply 12. Further, the system 11 or better the air-supply 12 may include a dry air buffer tank 16, in order to store (cooled and) dry air. This reserve of air allows a faster reaction when operating the aerating system 11. That means, (cool and) dry air can be provided to the self-aerating valve 1 instantaneously when desired, without the need of waiting for the air dryer 13. Further, a vacuum breaking valve 15 may be provided in the aerating system 11 or better the air-supply 12, namely between the drying unit 13 and the air-supply port 5 of the self-aerating valve 1, to allow dried air from the air-supply 12 to enter the chamber 14 before opening the valve 1.

The aerating system 11 may further be controllable by a control unit 17. In particular, the control unit 17 may be adapted to control the vacuum breaking valve 15 (open or close), the drying unit 13 (start and stop providing dry and preferably also cooled air), the pump 18 (start and stop of supplying air through the air-supply 12), and the self-aerating valve 1 (swiveling the valve flap 4, open or close any optional valves at the air-supply port 5). By controlling the aerating system 11 through the control unit 17, the aerating system 11 may be configured to supply air at least before the valve flap 4 of the self-aerating valve 1 swivels from the closing position to the opening position. Further, the aerating system 11 may be configured to supply, e.g. air to the at least one nozzle 9, at least while the valve flap 4 swivels from the opening position to the closing position.

In particular, the aerating system 11 may be controlled in the following manner. If enough from the products to be discharged have accumulated within the chamber 14, the valve flap 4 of the self-aerating valve 1 needs to be opened to discharge the products. While the valve flap 4 is still in the closing position, a negative pressure in the chamber 14 is maintained. The negative pressure may be necessary to protect the products in the chamber 14 from moist ambient air. In order to now open the valve flap 4, at first the pressure difference between the inside of the negatively pressurized chamber 14 and the other side of the chamber 14, i.e. the other side of the valve flap 4, which may either sit in the ambient or in another chamber with a higher pressure than the chamber 14, needs to be reduced or even eliminated. To this end, the aerating system 11 is preferably controlled to provide dried (and cooled) air to the air-supply port 5 of the self-aerating valve 1, which is then released via the porous membrane 7 into the chamber 14. Due to the air released into the chamber 14, a clumping of the products collecting at the self-aerating valve 1 is avoided or removed.

The pressure in the chamber 14 is preferably increased to ambient pressure (or respectively the pressure at the other side of the valve flap 4), more preferably even to a pressure above ambient pressure (or respectively above the pressure at the other side of the valve flap 4). Thereby, when the valve flap 4 is opened, no ambient air, which is typically moist enough to cause a clumping of the products in the chamber, particularly if those products are highly hygroscopic, is avoided from entering the chamber 14. As soon as the pressure in the chamber 14 is at the desired level, the valve flap 4 is opened, in order to discharge the products.

Due to the air introduced via preferably the porous membrane 7 of the valve flap 4, the products in the chamber 14 are whirled up and fluidized, so that after opening the valve flap 4 the products can exit the chamber 14, for instance by gravitational force, more easily and without dumping, i.e. overall in a more reliable manner.

During the discharging of the products, i.e. while the valve flap 4 is held in the opening position, air can be supplied to the at least one nozzle 9, in order to impinge the discharging products with air, in order to cause a further loosening of the products, and thus a reduced risk of dumping.

It is also possible and even of advantage to supply air to the at least one nozzle 9 shortly before the opening of the valve flap 4 and/or shortly before the closing of the valve flap 4, in order to avoid that fine products or product residues collect in the chamber 14 in the region of the valve flap 4 and/or its sealing 8.

After the products are discharged from the chamber 14, the valve flap 4 is advantageously closed as fast as possible, in order to quickly reestablish the negative pressure in the chamber 14. Thereby, it is avoided that moist ambient air enters the chamber 14. When the valve flap 4 is close to or again in the closing position, air may be supplied to the at least one nozzle 9, in order to create turbulences close to the self-aerating valve 1, which help to remove residues of the products, particularly from the valve flap 4 and/or the sealing 8. The air supplied to the at least one nozzle 9 also avoids that ambient air enters the chamber 14, while the valve flap 4 is getting into or in the closing position.

In summary, the present invention provides a more reliable discharge system, in particular for discharging hygroscopic products from a negatively pressurized chamber. The hygroscopic products may, for instance, be extruded or co-extruded products, particularly food or pet-food products, flakes, crisps, puffs, kibbles, pellets, sweets or the like, all of which are typically porous. The self-aerating valve 1 and the aerating system 11, respectively, enable machinability and stability of a product production process carried out at least partly under vacuum, for instance, an extrusion process. In particular, a production process of hygroscopic products, which are products highly sensible to moisture, may significantly be improved.

The invention claimed is:

1. An aerating system for a negatively pressurized chamber, the aerating system comprising:
    a self-aerating valve comprising: a valve body with an aperture; a valve flap swivel-mounted to the valve body and configured to swivel between a closing position for closing the aperture and an opening position for opening the aperture; and an air-supply port; and the valve flap is designed to release air supplied to the air-supply port into the aperture of the valve body in the closing position, the valve flap comprises a porous membrane connected to the air-supply port for releasing the supplied air;
    a first air-supply connected to the air-supply port of the self-aerating valve;
    a vacuum chamber for collecting hygroscopic products; and
    a discharging area for receiving the hygroscopic products, wherein the self-aerating valve is provided between the vacuum chamber and the discharging area, and the vacuum chamber and the discharging area are selectively connectable by the self-aerating valve.

2. The aerating system according to claim 1, wherein the porous membrane is a plastic and/or ceramic filter comprising a plurality of pores having a pore size of 1-20 μm for releasing the air.

3. The aerating system according to claim 1, wherein the valve body is designed to receive the valve flap at least partly in the closing position.

4. The aerating system according to claim 1, wherein a seal is provided between the valve flap and the valve body in the closing position.

5. The aerating system according to claim 1, wherein the valve body comprises a conically extending portion providing a connection for a container.

6. The aerating system according to claim 1, wherein the self-aerating valve is configured for discharging the hygroscopic products from the negatively pressurized chamber.

7. The aerating system according to claim 1, wherein the first air-supply comprises a drying unit adapted to dry the air supplied through the first air-supply to the air-supply port.

8. The aerating system according to claim 7, wherein the drying unit is also adapted to cool the air supplied through the air-supply to the air-supply port.

9. The aerating system according to claim 1, wherein the valve body comprises at least one nozzle connectable to a second air supply.

10. The aerating system according to claim 9, wherein the at least one nozzle is connected to the air-supply port.

11. The aerating system according to claim 9, wherein the first air-supply and the second air-supply are the same air-supply.

12. The aerating system according to claim 9, wherein the first air-supply and the second air-supply are different air-supplies.

13. The aerating system according to claim 1, wherein the aerating system is configured to supply the air to the air-supply port at least before the valve flap of the self-aerating valve swivels from the closing position to the opening position.

14. The aerating system according to claim 13, wherein the valve body comprises at least one nozzle connected to a second air-supply, and the aerating system is configured to supply the air to the at least one nozzle, at least while the valve flap swivels from the opening position to the closing position.

15. The aerating system according to claim 14, wherein the first air-supply and the second air-supply are the same air-supply.

16. The aerating system according to claim 14, wherein the first air-supply and the second air-supply are different air-supplies.

17. A method for discharging hygroscopic products from a negatively pressurized chamber, the method comprising:
   providing a valve body with an aperture;
   providing a valve flap swivel-mounted to the valve body and configured to swivel between a closing position for closing the aperture and an opening position for opening the aperture;
   providing an air-supply port connectable to an air-supply;
   providing air to the air-supply port; and
   the valve flap releasing the air supplied to the air-supply port into the aperture of the valve body in the closing position, the valve flap comprises a porous membrane connected to the air-supply port for releasing the supplied air, at least before swiveling the valve flap from the closing position to the opening position.

* * * * *